(12) United States Patent
Fang et al.

(10) Patent No.: US 11,808,334 B2
(45) Date of Patent: Nov. 7, 2023

(54) DRIVE AXLE ASSEMBLY FOR VEHICLE

(71) Applicant: BYD COMPANY LIMITED, Guangdong (CN)

(72) Inventors: Zeming Fang, Shenzhen (CN); Hailong Wei, Shenzhen (CN); Chupeng Quan, Shenzhen (CN); Huiyue Liu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 29 days.

(21) Appl. No.: 17/765,414

(22) PCT Filed: Sep. 24, 2020

(86) PCT No.: PCT/CN2020/117302
§ 371 (c)(1),
(2) Date: Mar. 30, 2022

(87) PCT Pub. No.: WO2021/063236
PCT Pub. Date: Apr. 8, 2021

(65) Prior Publication Data
US 2022/0356935 A1 Nov. 10, 2022

(30) Foreign Application Priority Data
Sep. 30, 2019 (CN) .......................... 201910944205.8

(51) Int. Cl.
*F16H 57/04* (2010.01)
*F16H 37/08* (2006.01)
(Continued)

(52) U.S. Cl.
CPC ......... *F16H 37/082* (2013.01); *B60B 35/125* (2013.01); *B60K 17/08* (2013.01); *B60K 17/16* (2013.01)

(58) Field of Classification Search
CPC ...... F16H 37/082; F16H 57/04; F16H 57/043; F16H 57/0456; F16H 57/0483;
(Continued)

(56) References Cited

U.S. PATENT DOCUMENTS

| 4,464,973 A | 8/1984 | Rodler, Jr. |
| 2012/0202635 A1 | 8/2012 | Lee et al. |

(Continued)

FOREIGN PATENT DOCUMENTS

| CN | 103244635 A | 8/2013 |
| CN | 203823028 U | 9/2014 |

(Continued)

OTHER PUBLICATIONS

English Translation of International Search Report from PCT/CN2020/117302 dated Nov. 27, 2020 (2 pages).

*Primary Examiner* — Justin Holmes
(74) *Attorney, Agent, or Firm* — CALFEE HALTER & GRISWOLD LLP (57) ABSTRACT

A drive axle assembly includes a motor; a first shaft and a second shaft. A right planet row mechanism is disposed on the first shaft, and a left planet row mechanism is disposed on the second shaft. A right sun gear of the right planet row mechanism is connected with the first shaft. A left sun gear of the left planet row mechanism is connected with the second shaft. The right sun gear has a right central oil passage and a right radial oil passage. The right central oil passage is in communication with the first shaft. The left sun gear has a left central oil passage and a left radial oil passage. The left central oil passage is in communication with the second shaft. The first shaft is in communication with the second shaft to supply oil to the second shaft.

13 Claims, 6 Drawing Sheets

(51) Int. Cl.
*B60B 35/12* (2006.01)
*B60K 17/08* (2006.01)
*B60K 17/16* (2006.01)

(58) Field of Classification Search
CPC .. F16H 57/08; F16H 57/0424; F16H 57/0426; F16H 57/0431; F16H 57/0457; F16H 57/0476; B60B 35/125; B60B 35/12; B60B 35/16; B60K 17/08; B60K 17/16
See application file for complete search history.

(56) References Cited

U.S. PATENT DOCUMENTS

| | | | |
|---|---|---|---|
| 2016/0363201 A1* | 12/2016 | McNally | B60K 17/348 |
| 2020/0408297 A1* | 12/2020 | Ishikawa | F16H 57/0471 |
| 2021/0221218 A1* | 7/2021 | Li | H02K 24/00 |

FOREIGN PATENT DOCUMENTS

| | | |
|---|---|---|
| CN | 104613162 A | 5/2015 |
| CN | 104943745 A | 9/2015 |
| CN | 205044513 U | 2/2016 |
| CN | 106080754 A | 11/2016 |
| CN | 106594222 A | 4/2017 |
| CN | 106627758 A | 5/2017 |
| CN | 106763749 A | 5/2017 |
| CN | 207327993 U | 5/2018 |
| DE | 102009031215 A1 | 1/2011 |
| EP | 3812617 A1 | 4/2021 |
| EP | 4039496 A1 | 8/2022 |
| JP | 08142904 A | 6/1996 |

\* cited by examiner

DRIVE AXLE ASSEMBLY FOR VEHICLE

CROSS-REFERENCE TO RELATED APPLICATIONS

The disclosure is a National Stage of PCT International Application No. PCT/CN2020/117302, filed on Sep. 24, 2020, which claims the priority to Chinese Patent Application No. 201910944205.8 filed by the BYD Co., Ltd. on Sep. 30, 2019 and entitled "DRIVE AXLE ASSEMBLY OF VEHICLE".

FIELD

The disclosure relates to the field of vehicles, and in particular, to a drive axle assembly of a vehicle.

BACKGROUND

In the related art, during operation of a drive axle assembly of a vehicle, if components in the drive axle assembly are not lubricated well, efficiency of transmission between gears and between the various components decreases, and abnormal noise occurs. In addition, insufficient lubrication of the components also leads to a reduction in the service life of each component.

SUMMARY

The disclosure is intended to resolve at least one of the technical problems existing in related art. The disclosure is intended to provide a drive axle assembly of a vehicle. The drive axle assembly of the vehicle can deliver oil to components required to be lubricated. In this way, the service life of each component in the drive axle assembly can be prolonged.

The drive axle assembly of a vehicle in the disclosure includes: a motor; a first gear, a second gear, a first shaft and a second shaft, connected with the motor in sequence, where the first shaft and the second shaft are both hollow shafts; a first shaft and a second shaft, dynamically coupled to the motor, where the first shaft and the second shaft are both hollow shafts; a right planet row mechanism is disposed on the first shaft; a left planet row mechanism is disposed on the second shaft; a right sun gear of the right planet row mechanism is connected with the first shaft; and a left sun gear of the left planet row mechanism is connected with the second shaft; wherein the right sun gear is configured to rotate synchronously with the first shaft; the right sun gear has a right central oil passage and a right radial oil passage in communication with the right central oil passage; the right central oil passage is in communication with the first shaft; and the left sun gear is configured to rotate synchronously with the second shaft; the left sun gear has a left central oil passage and a left radial oil passage in communication with the left central oil passage; the left central oil passage is in communication with the second shaft; and the first shaft is in communication with the second shaft to supply oil to the second shaft;

a gearbox; a right fork, movable between a first position and a second position; a right inner ring-gear support; a right sun gear, a right inner planet gear, and a right outer planet gear, disposed in the right inner ring-gear support, where the right inner planet gear is meshed with the right sun gear; the right outer planet gear is meshed with both the right inner planet gear and the right inner ring-gear support; the right sun gear is configured to rotate synchronously with the first shaft; the right sun gear has a right central oil passage and a right radial oil passage in communication with the right central oil passage; and the right central oil passage is in communication with the first shaft; a right planet support, connected with the right inner planet gear and the right outer planet gear; a left fork, movable between a third position and a fourth position; a left inner ring-gear support; a left sun gear and a left planet gear, disposed in the left inner ring-gear support, where the left sun gear is configured to rotate coaxially with the right inner ring-gear support; the left planet gear is meshed with both the left sun gear and the left inner ring-gear support; the left sun gear is configured to rotate synchronously with the second shaft; the left sun gear has a left central oil passage and a left radial oil passage in communication with the left central oil passage; the left central oil passage is in communication with the second shaft; and the first shaft is in communication with the second shaft to supply oil to the second shaft; a driving gear, configured to rotate synchronously with the left planet gear by using a left planet support; and a differential, connected with the driving gear. When the right fork is at the first position, the right planet support is connected with the gearbox. When the right fork is at the second position, the right planet support is connected with the first shaft. When the left fork is at the third position, the left inner ring-gear support is connected with the gearbox. When the left fork is at the fourth position, the left inner ring-gear support is connected with the second shaft.

Therefore, by means of the plurality of oil passages, the oil can be delivered to the components required to be lubricated during the operation of the drive axle assembly. In this way, the transmission efficiency of the drive axle assembly can be improved, the operating noise of the vehicle can be reduced, and the service life of each component in the drive axle assembly can be increased.

In some examples of the disclosure, the gearbox includes a right end cover. The right end cover has a pump body. The pump body has an oil inlet and an oil outlet. The oil outlet is in communication with the first shaft. The oil inlet is in communication with inside of the gearbox.

In some examples of the disclosure, a filter is disposed at the oil inlet.

In some examples of the disclosure, the right end cover has a first oil supply branch therein. The filter and the oil inlet are brought into communication with each other by using the first oil supply branch.

In some examples of the disclosure, the right end cover has a second oil supply branch therein. The second oil supply branch is in communication with the oil outlet. The second oil supply branch supplies oil to a meshed position between the first gear and the second gear by using a connected pipe.

In some examples of the disclosure, the right radial oil passage includes a plurality of right radial oil passages, and the left radial oil passage includes a plurality of left radial oil passages.

In some examples of the disclosure, the drive axle assembly of the vehicle further includes a shift solenoid valve, connected with the left fork and the right fork to drive the left fork and the right fork to move.

In some examples of the disclosure, the shift solenoid valve includes: an intake pipe, in communication with a gas source; a vent pipe; a right valve seat, being a hollow structure and having a first gas channel and a second gas channel; a right valve core, movably disposed in the right valve seat to separate an inner space of the right valve seat into a first cavity and a second cavity, where the first gas channel is in communication with the first cavity, the second gas channel is in communication with the second cavity; the right valve core is pushed to move by controlling air pressure of the first cavity and the second cavity; and the right valve core is connected with the right fork; a first solenoid valve, connected and in communication with the first gas channel, the intake pipe, and the vent pipe to control the first gas channel to allow or prevent flow of a gas through the first gas channel; a second solenoid valve, connected and in communication with the second gas channel, the intake pipe, and the vent pipe to control the second gas channel to allow or prevent flow of a gas through the second gas channel; a left valve seat, being a hollow structure and having a third gas channel and a fourth gas channel; a left valve core, movably disposed in the left valve sea to separate an inner space of the left valve seat into a third cavity and a fourth cavity, where the third gas channel is in communication with the third cavity, the fourth gas channel is in communication with the fourth cavity, the left valve core is pushed to move by controlling air pressure of the third cavity and the fourth cavity, and the left valve core is connected with the left fork; a third solenoid valve, connected and in communication with the third gas channel, the intake pipe, and the vent pipe to control the third gas channel to allow or prevent flow of a gas through the third gas channel; and a fourth solenoid valve, connected and in communication with the fourth gas channel, the intake pipe, and the vent pipe to control the fourth gas channel to allow or prevent flow of a gas through the fourth gas channel.

In some examples of the disclosure, a muffler is disposed on the vent pipe.

In some examples of this application, the left fork is inserted in the left valve seat, and the left fork is connected with the left valve core by a left threaded member. The right fork is inserted in the right valve seat, and the right fork is connected with the right valve core by a right threaded member.

In some examples of the disclosure, the drive axle assembly of the vehicle further includes a left half shaft, connected with the differential; and a right half shaft, connected with the differential by a differential lock, where the differential lock is switchable between a locked state and an unlocked state. When the differential lock is in the locked state, the left half shaft and the right half shaft rotate at a same speed. When the differential lock is in the unlocked state, the left half shaft and the right half shaft rotate at different speeds.

In some examples of the disclosure, a left gear sleeve is disposed on the left half shaft, and a right gear sleeve is disposed on the right half shaft and movably sleeved on the right half shaft; The differential lock includes: a stop rod, disposed in the differential; a fork rod, sleeved on the stop rod, movable between a locked position and an unlocked position along the stop rod, and connected with the right gear sleeve; a pneumatic assembly, connected with the fork rod to drive the fork rod to move; a spring, sleeved on the stop rod to drive the fork rod to switch to the unlocked position. When the fork rod is at the locked position, the differential lock is in the locked state. When the fork rod is at the unlocked position, the differential lock is in the unlocked state.

Additional aspects and advantages of this application will be given in the following description, some of which will become apparent from the following description or may be learned from practices of the disclosure.

DETAILED DESCRIPTION

The following describes embodiments of the disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary and used only for explaining this application, and should not be construed as a limitation on the disclosure.

A drive axle assembly 10 of a vehicle in the embodiments of the disclosure is described below with reference to FIG. 1 to FIG. 11.

As shown in FIG. 1 to FIG. 11, the drive axle assembly 10 in the embodiments of the disclosure includes: a motor 1, a left planet row, a right planet row, a first gear 11, a second gear 12, a first shaft 13, a second shaft 14, a gearbox 2, a right fork 3, a right inner ring-gear support 4, a right sun gear 41, a right inner planet gear 42 and a right outer planet gear 43, a right planet support 44, a left fork 5, a left inner ring-gear support 6, a left sun gear 61, a left planet gear 62, a driving gear 7, and a differential 8. An output shaft of the motor 1, the first gear 11, the second gear 12, the first shaft 13, and the second shaft 14 are connected in sequence. The first shaft 13 and the second shaft 14 are configured as hollow shafts. The right fork 3 is movable between a first position and a second position. The first position is a left end of the right fork 3 in FIG. 4, and the second position is a right end of the right fork 3 in FIG. 4. The right sun gear 41, the right inner planet gear 42, and the right outer planet gear 43 are disposed in the right inner ring-gear support 4. The right inner planet gear 42 is meshed with the right sun gear 41. The right outer planet gear 43 is meshed with the right inner planet gear 42 and the right inner ring-gear support 4. The right sun gear 41 is connected with the first shaft 13. The right sun gear 41 is configured to rotate synchronously with the first shaft 13.

The right planet support 44 is connected with both the right inner planet gear 42 and the right outer planet gear 43. The left fork 5 is movable between a third position and a fourth position. The third position is a right end of the left fork 5 in FIG. 4, and the fourth position is a left end of the right fork 3 in FIG. 4. The left sun gear 61 and the left planet gear 62 are disposed in the left inner ring-gear support 6. The left sun gear 61 is configured to rotate coaxially with the right inner ring-gear support 4. The left planet gear 62 is meshed with the left sun gear 61 and the left inner gear ring support 6. The left sun gear 61 is connected with the second shaft 14. The left sun gear 61 is configured to rotate synchronously with the second shaft 14. The driving gear 7 is configured to rotate synchronously with the left planetary gear 62 by using a left planet support. The differential 8 is connected with the driving gear 7. When the right fork 3 is at the first position, the right planet support 44 is connected with a housing of the gearbox 2. When the right fork 3 is at the second position, the right planet support 44 is connected with the first shaft 13. When the left fork 5 is at the third position, the left inner ring-gear support 6 is connected with the gearbox 2. When the left fork 5 is at the fourth position, the left inner ring-gear support 6 is connected with the second shaft 14.

Figure 4:
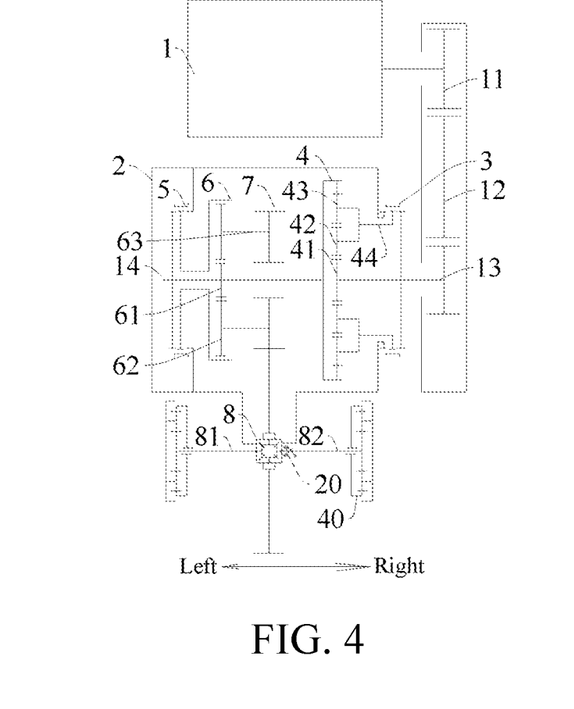
FIG. 4 is a schematic transmission diagram of the drive axle assembly according to an embodiment of the disclosure.
Figure 5:
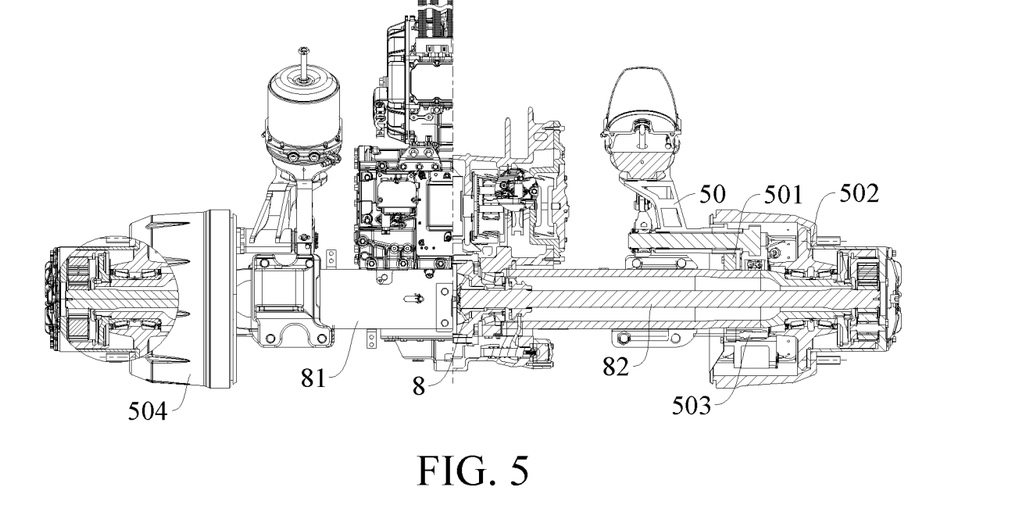
FIG. 5 is a half cross-sectional view of partial structural of the drive axle assembly according to an embodiment of the disclosure.
Figure 6:
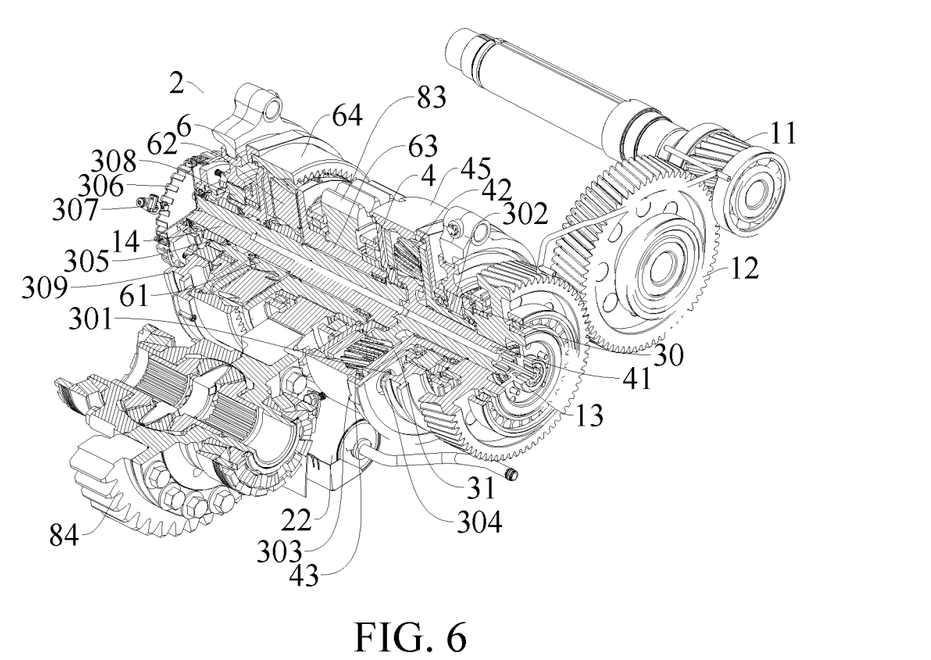
FIG. 6 is a cross-sectional view of a gear transmission structure in the gearbox of the drive axle assembly according to an embodiment of the disclosure.

Specifically, after the drive axle assembly 10 is mounted to the vehicle, when the vehicle is operating at the first gear, the right fork 3 is at the first position, the left fork 5 is at the third position, the right planet support 44 is connected with the housing of the gearbox 2, and the left inner ring-gear support 6 is connected with the housing of the gearbox 2. Power of the motor 1 is successively transmitted to the first gear, the second gear, and the first shaft. Then the first shaft drives the right sun gear 41 to rotate. Next, the right sun gear 41 successively transmits the power to the right inner planet gear 42, the right outer planet gear 43, the right inner ring-gear support 4, and the second shaft. Then the second shaft drives the left sun gear 61 to rotate. Afterwards, the left sun gear 61 successively transmits the power to the left planet gear 62, a left planet rack 63, and the driving gear 7, and then the driving gear 7 transmits the power to the differential 8. The differential 8 transmits the power to a left half shaft 81 and a right half shaft 82. In this way, driving the vehicle gears to rotate is achieved.

Further, when the vehicle is operating at a second gear, the right fork 3 is at the second position, the left fork 5 is at the third position, the right planet support 44 is connected with the first shaft 13, the left inner ring-gear support 6 is connected with the housing of the gearbox 2. The power of the motor 1 is successively transmitted to the first gear, the second gear, and the first shaft. Then the first shaft drives the right planet support 44 to drive the right inner planet gear 42 and the right outer planet gear 43 to rotate. Next, the right outer planet gear 43 drives the right inner ring-gear support 4 and thereby drives the second shaft to rotate. Then the second shaft drives the left sun gear 61 to rotate. Afterwards, the left sun gear 61 successively transmits the power to the left planet gear 62, the left planet rack 63, and the driving gear 7, and then the driving gear 7 transmits the power to the differential 8. The differential 8 transmits the power to the left half shaft 81 and the right half shaft 82. In this way, driving the vehicle gears to rotate is achieved.

Further, when the vehicle is operating at a third gear, the right fork 3 is at the first position, the left fork 5 is at the fourth position, the right planet support 44 is connected with the housing of the gearbox 2, and the left inner ring-gear support 6 is connected with the second shaft 14. The power of the motor 1 is successively transmitted to the first gear, the second gear, and the first shaft. Then the first shaft drives the right sun gear 41 to rotate. Next, the right sun gear 41 successively transmits the power to the right inner planet gear 42, the right outer planet gear 43, the right inner ring-gear support 4, and the second shaft. Afterwards, the second shaft drives the left inner ring-gear support 6 to drive the left planet gear 62 to rotate, and then the left planet gear 62 transmits the power to the left planet rack 63 and the driving gear 7. Then the driving gear 7 transmits the power to the differential 8. The differential 8 transmits the power to the left half shaft 81 and the right half shaft 82. In this way, driving the vehicle gears to rotate is achieved.

Further, when the vehicle is operating in a fourth gear, the right fork 3 is at the second position, the left fork 5 is at the fourth position, the right planet support 44 is connected with the first shaft 13, and the left inner ring-gear support 6 is connected with the second shaft 14. The power of the motor 1 is successively transmitted to the first gear, the second gear, and the first shaft. Then the first shaft drives the right planet support 44 to drive the right inner planet gear 42 and the right outer planet gear 43 to rotate. Next, the right outer planet gear 43 drives the right inner ring-gear support 4 and thereby drives the second shaft to rotate. Then the second shaft drives the left inner ring-gear support 6 and thereby drives the left planet gear 62 to rotate. Afterwards, the left planet gear 62 transmits the power to the left planet rack 63 and the driving gear 7, and then the driving gear 7 transmits the power to the differential 8. The differential 8 transmits the power to a left half shaft 81 and a right half shaft 82. In this way, driving the vehicle gears to rotate is achieved.

In addition, the motor 1 is driven by an external three-phase line power supply. The motor 1 may be fixed to the housing of the gearbox 2 by bolts. External splines of the output shaft of the motor 1 are mated with internal splines of the first gear 11 to output the power to the first gear 11. Angular contact ball bearings are disposed on two ends of the first gear 11, to support the first gear 11 on the housing of the gearbox 2. The first gear 11 transmits the power to the second gear 12. The second gear 12 is mounted to the housing of the gearbox 2 by using a pair of tapered roller bearings. The second gear 12 transmits the power to the first shaft 13. Cylindrical roller bearings are disposed on two ends of the first shaft 13 and are supported on the housing of the gearbox 2. Internal splines machined on a left end of the first shaft 13 are connected with the right sun gear 41. External splines machined on a right end of the first shaft 13 are connected with a right engagement gear 30. The right sun gear 41 is meshed with the right inner planet gear 42 for transmission, and the right inner planet gear 42 is meshed with the right outer planet gear 43 for transmission. The right inner planet gear 42 and the right outer planet gear 43 may be assembled to the right planet support 44 by using a planet shaft pin 301. The right outer planet gear 43 is meshed with a right ring gear 45. The right ring gear 45 is connected with the right inner ring-gear support 4 by a helical gear. The right planet support 44 is connected with a right gear holder 302 by splines. An outer diameter of the right planet support 44 may be fixed to the housing of the gearbox 2 by using a cylindrical pin 303.

The right fork 3 is controlled to move to drive a right slidable gear sleeve 304 to move between the first position and the second position, so that a speed ratio and transmission power of the drive axle assembly 10 can be changed. The second shaft 14 may be fixed to the housing of the gearbox 2 and the left planet rack 63 by using the angular contact bearings and needle roller bearings. External splines of the second shaft 14 are connected with the right inner ring-gear support 4. A middle of the second shaft 14 is connected with the left sun gear 61. A left end of the second shaft 14 is connected with a left engagement gear 305. The left end of the second shaft 14 is connected with a sensing gear 306. The gear shifting is controlled by a connected vehicle speed sensor 307. The left sun gear 61 is meshed with the left planet gear 62. The left planet gear 62 is meshed with a left ring gear 64. The left ring gear 64 is connected with the left inner ring-gear support 6 by a helical gear. The left inner ring-gear support 6 is connected with a left gear holder 308 by splines. The left planet gear 62 is assembled to the left planet rack 63 by using a planet shaft. A right side of the left planet rack 63 is supported on the housing of the gearbox 2 by using two cylindrical roller bearings. The left fork 5 may be fixed to the housing of the gearbox 2 by using the cylindrical pin 303. The movement of the left fork 5 drives the left slidable gear sleeve 309 to move between the third position and the fourth position, thereby changing the speed ratio and transmitting the power. The driving gear 7 is connected with the left planet rack 63 by splines. The differential 8 is fixed to the housing of the gearbox 2 by using bolts. The power outputted from the gearbox 2 is transmitted to an output gear 84 of the differential 8 by the driving gear 7.

The drive axle assembly 10 in the disclosure uses a double planet row shifting structure, and has only one main shaft, that is, the second shaft 14. The shifting gear train is small in size, easy to machine, and low in cost. The entire drive axle assembly 10 is light in weight and small in size. Double sets of planet gear trains are used to control the movement of the slidable gear sleeve to control the planet rack to be fixed or not, thereby achieving 4-gear power transmission. In this way, a coverage area of the speed ratio is large, and the transmission torque is larger. Therefore, a plurality of complex working conditions can be dealt with. The entire power assembly uses a helical gear, so that the transmission of the entire drive axle assembly 10 is smooth, and the noise is lower. During operation at the different gears, some meshed gears do not rotate relative to each other, and the entire left planet row does not move at a neutral position. In this way, the service life of the gears can be increased.

It should be noted that, compared with the prior art, the drive axle assembly 10 configured by using the above technical solutions has a small size, and can be conveniently arranged on a vehicle. Therefore, a ground clearance of the vehicle is larger, and the trafficability characteristic of the vehicle is more desirable. In addition, the motor 1 is smaller in size and lighter in weight, and has a higher rotation speed. A moment of inertia of the motor 1 is smaller, facilitating gear shifting. Maximum efficiency of the motor 1 is also relatively improved. An efficiency range of the rotation speed of the entire motor 1 is larger, and a proportion of efficiency above 90% to the total efficiency range is 90.2%. In this way, the economic efficiency of use can be effectively improved. Moreover, the drive axle assembly 10 uses the double planet gear train shifting structure, and the second shaft 14 is the main shaft. The shifting gear is small in size, easy to machine, and low in cost. During travelling of the whole vehicle, a relatively small torque is generated on an attachment surface of the axle assembly and the power assembly. In this way, an oil leakage and oil penetration caused by cracking of the attachment surface or a relatively large strain are prevented. In addition, when the gears in the drive axle assembly 10 transmit a torque, no gear is idle. In this way, transmission efficiency of the drive axle assembly 10 can be improved, and operating noise of the vehicle can be reduced.

Moreover, the drive axle assembly 10 has many gears. Therefore, the drive axle assembly can adapt to different road conditions such as an uphill or a flat road, and the energy consumption is proper and low. A gear-side planetary reducer is further disposed on the drive axle assembly 10. Therefore, the size of the electric power assembly can be effectively reduced, the arrangement is more proper, the transmission ratio is large, and the output torque is large, thereby satisfying a large load requirement.

The drive axle assembly 10 of the disclosure has a simple and compact structure and a small weight. A ground clearance of the vehicle after the drive axle assembly 10 is assembled to the vehicle can be increased. In addition, when the gears in the drive axle assembly 10 transmit a torque, no gear is idle. In this way, the transmission efficiency of the drive axle assembly 10 can be improved, and the operating noise of the vehicle can be reduced.

In some examples of the disclosure, the right sun gear 41 has a right central oil passage 411 and a right radial oil passage 412 in communication with the right central oil passage 411. The right central oil passage 411 is in communication with the first shaft 13. The left sun gear 61 has a left central oil passage 611 and a left radial oil passage 612 in communication with the left central oil passage 611. The left central oil passage 611 is in communication with the second shaft 14. The first shaft 13 is in communication with an oil passage of the second shaft 14. Oil in the first shaft 13 can flow into the second shaft 14 to supply oil to the second shaft 14. After the oil enters the oil passage of the first shaft 13, the oil flows into the right central oil passage 411, and then the oil flows into the right radial oil passage 412 from the right central oil passage 411. In addition, the oil also flows into the second shaft 14, and then the oil successively flows into the left central oil passage 611 and the left radial oil passage 612 from the second shaft 14. During meshing of the right sun gear 41 and the left sun gear 61 with other gears, the right sun gear 41 and the left sun gear 61 can deliver the oil to different components, so that the oil can reach different positions on the drive axle assembly 10. In this way, a flowing range of the oil can be increased, thereby enhancing the effect of lubricating the drive axle assembly 10.

Therefore, by means of the plurality of oil passages, the oil can be delivered to the components required to be lubricated during the operation of the drive axle assembly 10. In this way, the transmission efficiency of the drive axle assembly 10 can be improved, the operating noise of the vehicle can be reduced, and the service life of each component in the drive axle assembly 10 can be increased.

Figure 9:
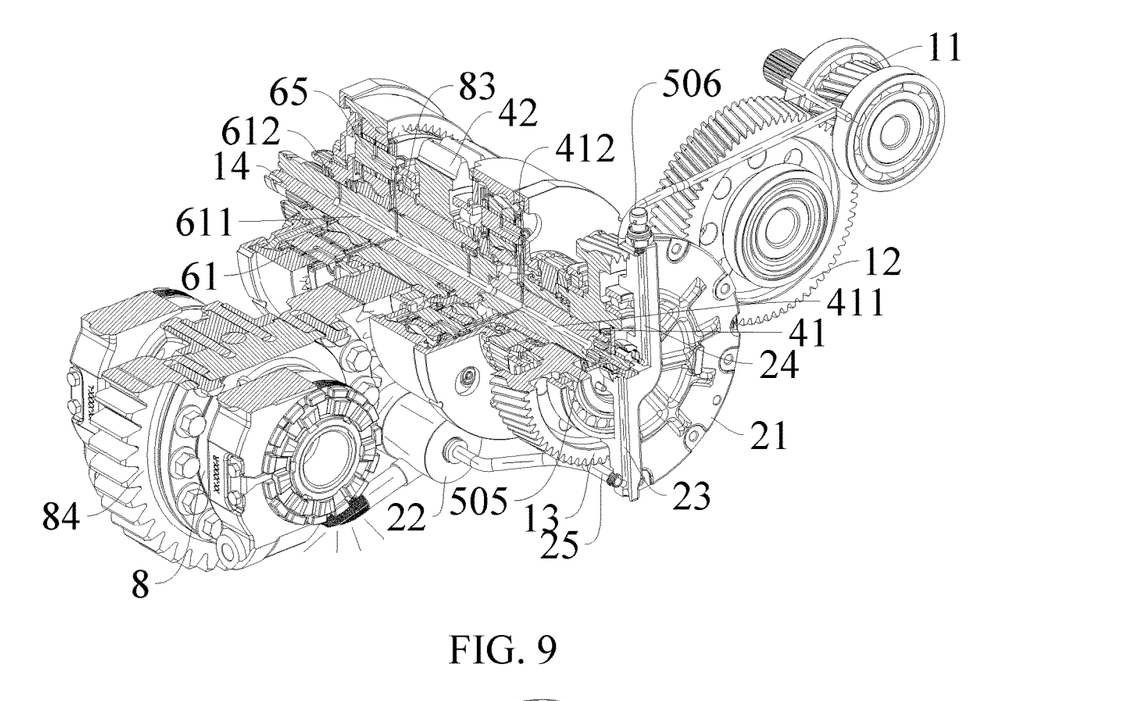
FIG. 9 is a schematic arrangement diagram of a lubricating oil passage of the drive axle assembly according to an embodiment of the disclosure.
Figure 10:
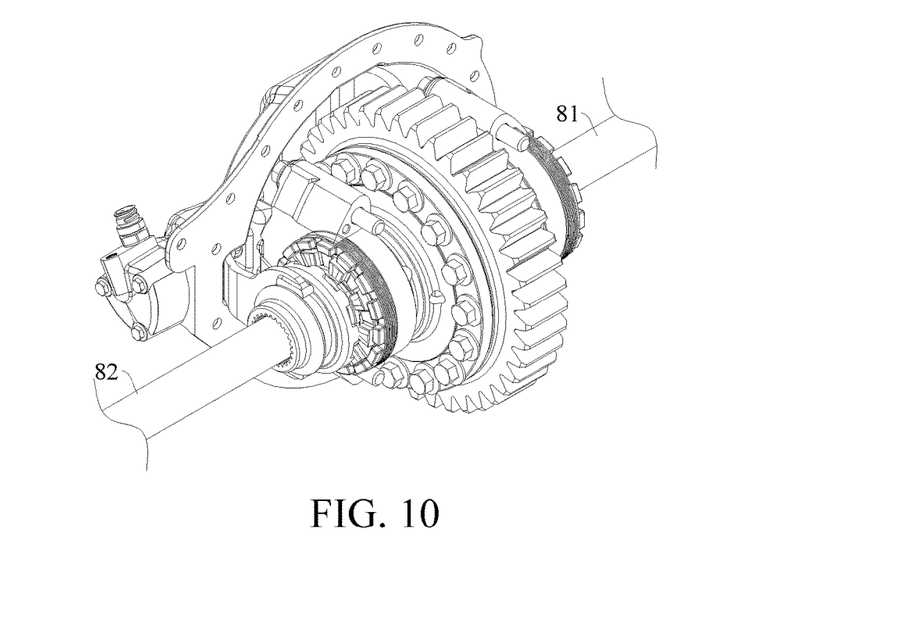
FIG. 10 is a schematic assembled diagram of a differential lock and a half shaft of the drive axle assembly according to an embodiment of the disclosure.

In some examples of the disclosure, as shown in FIG. 9, the gearbox 2 may include a right end cover 21. The right end cover 21 may have a pump body. The pump body is disposed on the first shaft 13, and has an oil inlet and an oil outlet. The oil outlet is in communication with the first shaft 13, and the oil inlet is in communication with inside of the gearbox 2. The inside of the gearbox 2 may have oil. When the pump body is operating, the oil may be pumped into the pump body through the oil inlet, and then the oil flows into the first shaft 13 through the oil outlet, thereby delivering the oil to each component.

In some examples of the disclosure, as shown in FIG. 9, a filter 22 may be disposed at the oil inlet, and the filter 22 can provide filtering. Before the oil flows into the oil inlet, the filter 22 may filter out impurities such as scrap iron in the oil, to prevent the impurities such as the scrap iron from flowing into the first shaft 13, thereby preventing the impurities such as the scrap iron from blocking the first shaft 13.

In some examples of the disclosure, as shown in FIG. 9, the right end cover 21 may have a first oil supply branch 23 therein. The filter 22 and the oil inlet are brought into communication with each other by using the first oil supply branch 23. By means of the arrangement, the oil filtered by the filter 22 can be delivered to the oil inlet.

In some examples of the disclosure, as shown in FIG. 9, the right end cover 21 may have a second oil supply branch 24 therein. The second oil supply branch 24 is in communication with the oil outlet. The second oil supply branch 24 supplies oil to a meshed position between the first gear 11 and the second gear 12 by using a connected pipe 25. After the oil flows out of the oil outlet, at least part of the oil flows into the second oil supply branch 24. By means of the second oil supply branch 24, the oil can be delivered to the meshed position between the first gear 11 and the second gear 12. During rotation of the first gear 11 and the second gear 12, the oil can be delivered to other components. In this way, the delivery range of the oil can be further expanded, thereby further enhancing the effect of lubricating other components in the drive axle assembly 10.

In some examples of the disclosure, as shown in FIG. 9, a plurality of right radial oil passages 412 may be disposed, and a plurality of left radial oil passages 612 may be disposed. In this way, the oil can quickly flow to each component, so that the component can be lubricated in time, thereby preventing a failure of each component.

Specifically, as shown in FIG. 9, the components in the drive axle assembly 10 are lubricated by splash lubrication and a pressure circulation lubrication respectively. The differential 8 is lubricated by splash lubrication. The entire differential 8 is half immersed in gear oil. Driven by an input gear of the differential 8, an output gear 84 on the differential 8 rotates to drive the oil to lubricate the entire differential 8. The remaining components in the drive axle assembly 10 are lubricated from the inside to outside by the pressure circulation. During operation in the drive axle assembly 10, a gear on the first shaft 13 rotate to drive a splined sleeve 505 to rotate. The splined sleeve 505 is connected with an inner rotor assembly by splines. An outer rotor assembly is assembled between the right end cover 21 and an oil pump cover. A gear on the first shaft 13 drives the splined sleeve 505 to rotate, so as to drive the inner rotor assembly to rotate. The inner rotor assembly drives the outer rotor assembly to rotate to form a pressure difference. After the iron scrap in the gear oil is filtered out by the filter 22, the gear oil enters a low pressure oil inlet passage of the right end cover 21 (that is, the first oil supply branch 23). High and low pressure oil passages and a countersunk hole for mounting the outer rotor are formed on the right end cover 21. After pressurized by the oil pump, the gear oil forms high pressure oil and is split into two paths. One path goes upward and passes through a high pressure oil pipe (that is, the second oil supply branch 24) to lubricate the first gear 11, the second gear 12, and respective angular contact bearings. An other path passes through splined sleeve 505 through the oil pump cover to enter the central oil passage of the right sun gear 41. Radial oil passages are all respectively formed on the right sun gear 41, a right planet rack, and a right planet pin shaft. The high pressure oil passes through the radial oil passage of the right sun gear 41 and enters the radial oil passage of the right planet rack, and then the high pressure oil passes through a right planet shaft to lubricate each needle roller bearing and each gear, and thereby lubricate an entire right planet row assembly. The high pressure oil enters the second shaft 14 through the right sun gear 41. A plurality of radial oil passages are also respectively formed on the second shaft 14, the left planet rack 63, and a left planet shaft 65. The high pressure oil enters the left planet rack 63 and the left planet shaft 65 through the radial oil passage of the left sun gear 61, lubricates the bearings and each gear, to lubricate the bearings and the gears, and thereby lubricate a left planet row assembly. A pressure sensor 506 is mounted to the high pressure oil passage of the right end cover 21. The pressure sensor 506 can effectively control the circulation of the oil to avoid damage to the gears and the bearings caused by the failure of the lubrication system. By means of the pressure circulation lubrication from inside to outside, the oil temperature can be effectively controlled to reduce, and the loss of transmission efficiency can be reduced. Therefore, the pressure circulation lubrication from inside to outside has huge advantages.

In some examples of the disclosure, an axis of the first shaft 13 and an axis of the second shaft 14 are located on a same straight line. In a height direction of the drive axle assembly 10, a height of the axis of the first shaft 13 and a height of the axis of the second shaft 14 are both larger than a height of a center of the differential 8. The axis of the first shaft 13 and the axis of the second shaft 14 are not immersed in the gear oil. When the drive axle assembly 10 operates, the gear oil is not driven by the gear to throw at a high speed. In this way, the oil temperature can be effectively control to reduce, thereby avoiding a failure of the components and reducing the loss of transmission efficiency.

In some examples of the disclosure, when the right fork 3 is at the first position and the left fork 5 is at the third position, a transmission ratio of transmission by the motor 1 to the differential 8 is i1. The transmission ratio i1 is a transmission ratio at a first gear. When the right fork 3 is at the first position and the left fork 5 is at the fourth position, the transmission ratio of the transmission by the motor 1 to the differential 8 is i2. The transmission ratio i2 is a transmission ratio at a third gear. When the right fork 3 is at the second position and the left fork 5 is at the third position, the transmission ratio of the transmission by the motor 1 to the differential 8 is i3. The transmission ratio i3 is a transmission ratio at a second gear. When the right fork 3 is at the second position and the left fork 5 is at the fourth position, the transmission ratio of the transmission by the motor 1 to the differential 8 is i4. The transmission ratio i4 is a transmission ratio at a fourth gear. i1, i2, i3, and i4 are in descending order or ascending order in sequence. In this way, the gear of the vehicle can be changed, so that the vehicle can travel at different gears.

Figure 8:
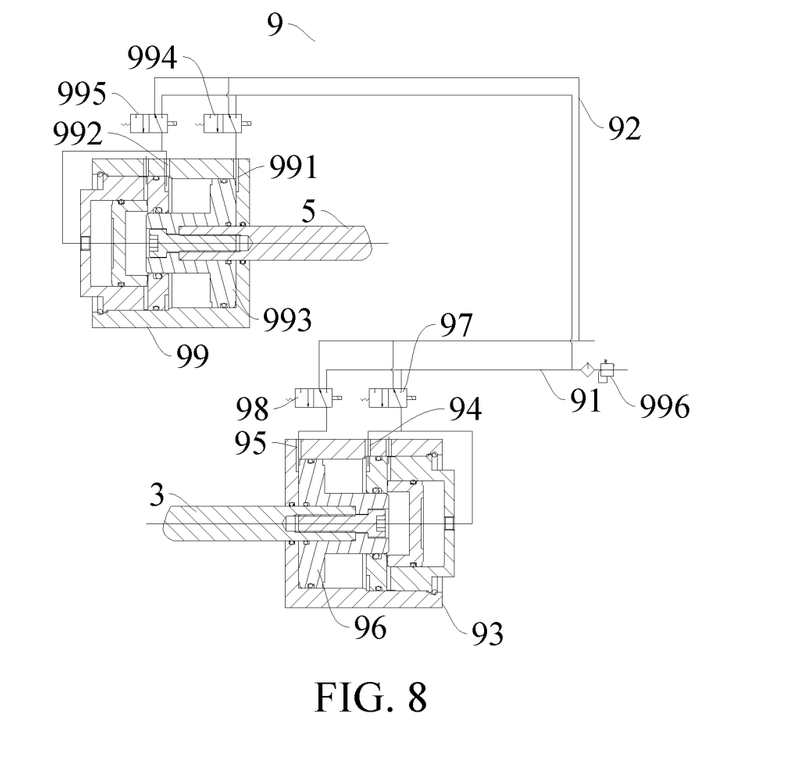
FIG. 8 is a principle diagram of the shift solenoid valve of the drive axle assembly according to an embodiment of the disclosure.

In some examples of the disclosure, as shown in FIG. 8, the drive axle assembly 10 may further include a shift solenoid valve 9. The shift solenoid valve 9 is connected with the left fork 5 and the right fork 3. The shift solenoid valve 9 can drive the left fork 5 and the right fork 3 to move. By means of the arrangement, the fork and the right fork 3 can be driven to move, thereby realizing the shift function of the vehicle.

In some examples of the disclosure, as shown in FIG. 8, the shift solenoid valve 9 may include an intake pipe 91, a vent pipe 92, a right valve seat 93, a right valve core 96, a first solenoid valve 97, a second solenoid valve 98, a left valve seat 99, a left valve core 993, a third solenoid valve 994, and a fourth solenoid valve 995. The intake pipe 91 is in communication with a gas source. The right valve seat 93 is configured as a hollow structure. The right valve seat 93 has a first gas channel 94 and a second gas channel 95. The right valve core 96 is movably disposed in the right valve seat 93. The right valve core 96 may be adapted to separate an inner space of the right valve seat 93 into a first cavity and a second cavity. The first gas channel 94 is in communication with the first cavity, and the second gas channel 95 is in communication with the second cavity. The right valve core 96 is pushed to move by controlling gas pressure of the first cavity and the second cavity. The right valve core 96 is connected with the right fork 3. In this way, driving the right fork 3 to move is realized. The first solenoid valve 97 is connected and in communication with the first gas channel 94, the intake pipe 91, and the vent pipe 92. The first solenoid valve 97 may control the first gas channel 94 to allow or prevent flow of a gas through the first gas channel. The second solenoid valve 98 is connected and in communication with the second gas channel 95, the intake pipe 91, and the vent pipe 92. The second solenoid valve 98 may control the second gas channel 95 to allow or prevent flow of a gas through the second gas channel.

In addition, the left valve seat 99 may be configured as a hollow structure. The left valve seat 99 has a third gas channel 991 and a fourth gas channel 992. The left valve core 993 is movably disposed in the left valve seat 99. The left valve core 993 may be adapted to separate an inner space of the left valve seat 99 into a third cavity and a fourth cavity. The third gas channel 991 is in communication with the third cavity, and the fourth gas channel 992 is in communication with the fourth cavity. The left valve core 993 is pushed to move by controlling gas pressure of the third cavity and the fourth cavity. The left valve core 993 is connected with the left fork 5. The third solenoid valve 994 is connected and in communication with the third gas channel 991, the intake pipe 91, and the vent pipe 92. The third solenoid valve 994 may control the third gas channel 991 to allow or prevent flow of a gas through the third gas channel. The fourth solenoid valve 995 is connected and in communication with the fourth gas channel 992, the intake pipe 91, and the vent pipe 92. The fourth solenoid valve 995 may control the fourth gas channel 992 to allow or prevent flow of a gas through the fourth gas channel.

Specifically, the intake pipe 91 is in communication with an air compressor gas source on the vehicle. The first solenoid valve 97, the second solenoid valve 98, the third solenoid valve 994, and the fourth solenoid valve 995 are all connected with a shift control harness. The solenoid valve is controlled to turn on or off by the shift control harness. High pressure air in the air compressor is controlled to enter the intake pipe 91, to control the left fork 5 and the right fork 3 to move. The shift solenoid valve 9 has no cumbersome mechanism such as a synchronizer, and has a simple structure, can be conveniently maintained and repaired, and has a lower price. In addition, since the vehicle speed sensor 307 is disposed on the left end of the second shaft, scrap iron of an axle is prevented from being attached to a magnetic head of the sensor and affecting the shift function. A signal outputted by the vehicle speed sensor 307 is transmitted to a vehicle controller. The vehicle controller controls the solenoid valve to turn on or off by using the shift control harness, to realize automatic shifting. The operational performance is desirable.

In some examples of the disclosure, as shown in FIG. 8, a muffler 996 may be disposed on the vent pipe 92. The muffler 996 has a noise reduction function. By means of the arrangement, the operating noise of the shift solenoid valve 9 can be reduced, so that the travelling noise of the vehicle can be reduced, thereby improving user satisfaction.

Figure 7:
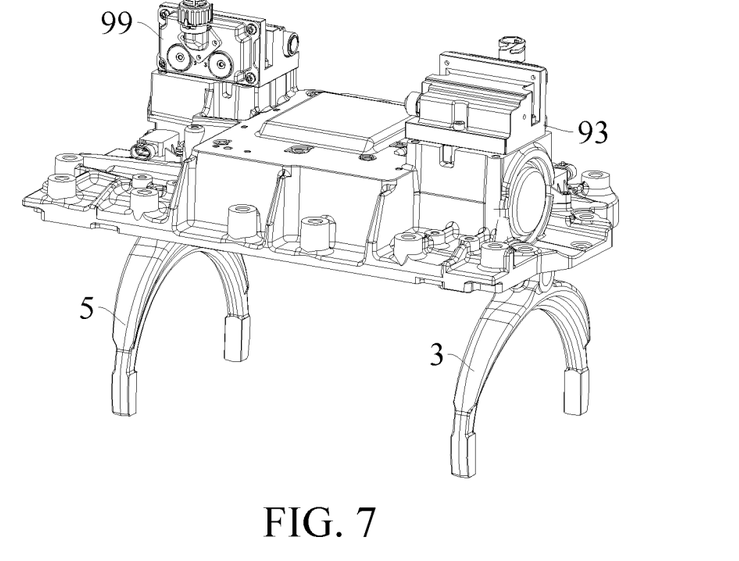
FIG. 7 is a schematic assembled diagram of a shift solenoid valve, a right fork, and a left fork of the drive axle assembly according to an embodiment of the disclosure.

In some examples of the disclosure, as shown in FIG. 7 and FIG. 8, the left fork 5 is inserted in the left valve seat 99. The left fork 5 is connected with the left valve core 993 by a left threaded member. By means of the arrangement, the left fork 5 and the left valve core 993 can be reliably assembled together, and the left fork 5 can move together with the left valve core 993. In this way, the operating performance of the solenoid valve can be ensured, thereby ensuring that the vehicle can shift the gear.

In some examples of the disclosure, the right fork 3 is inserted in the right valve seat 93. The right fork 3 is connected with the right valve core 96 by a right threaded member. By means of the arrangement, the right fork 3 and the right valve core 96 can be reliably assembled together, and the right fork 3 can move together with the right valve core 96. In this way, the operating performance of the solenoid valve can be ensured, thereby ensuring that the vehicle can shift the gear.

Figure 11:
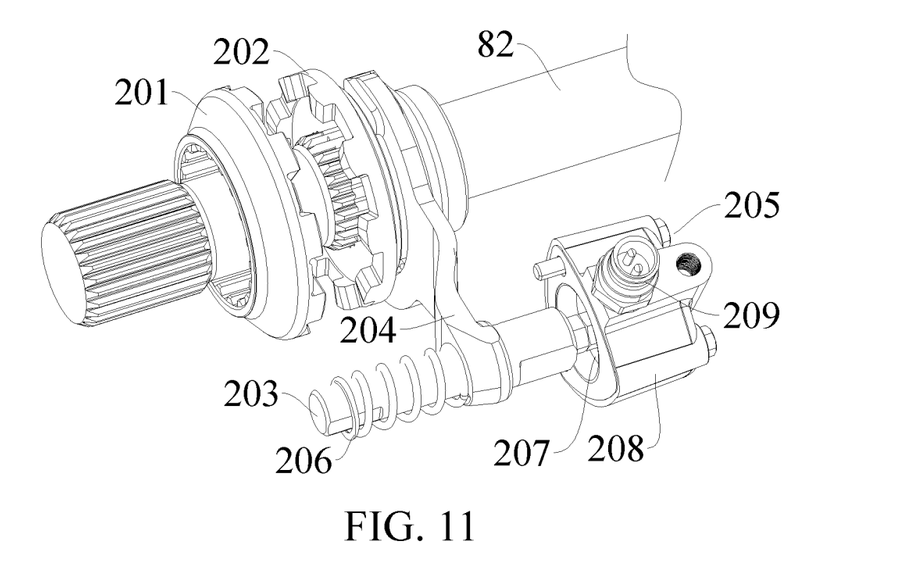
FIG. 11 a schematic structural diagram of the differential lock of the drive axle assembly according to an embodiment of the disclosure.

In some examples of the disclosure, as shown in FIG. 4 and FIG. 11, the drive axle assembly 10 may further include a left half shaft 81 and a right half shaft 82. The left half shaft 81 is connected with the differential 8, and the right half shaft 82 is connected with the differential 8. The right half shaft 82 may be connected with the differential 8 by a differential lock 20. The differential lock 20 may be switched between a locked state and an unlocked state. When the differential lock 20 is in the locked state, that is, the left half shaft 81 and the right half shaft 82 are connected as a whole, the left half shaft 81 and the right half shaft 82 rotate at a same speed. When the differential lock 20 is in the unlocked state, that is, the left half shaft 81 and the right half shaft 82 are separated from each other, and the left half shaft 81 and the right half shaft 82 rotate at different speeds. The differential lock 20 is configured to connect the left half shaft 81 to the right half shaft 82. When the left half shaft 81 is connected with the right half shaft 82, the left half shaft 81 and the right half shaft 82 rotate at the same speed, so that gear speeds of the vehicle are the same. When the left half shaft 81 is not connected with the right half shaft 82, the left half shaft 81 and the right half shaft 82 may rotate at different speeds, so that the gear speeds of the vehicle are different. Therefore, the vehicle can be controlled to travel in different working conditions. In this way, the vehicle can adaptively travel on different roads.

In some examples of the disclosure, as shown in FIG. 11, a left gear sleeve 201 (that is, the left slidable gear sleeve 309) is disposed on the left half shaft 81, and a right gear sleeve 82 (that is, the right slidable gear sleeve 304) is disposed on the right half shaft 202. The right gear sleeve 202 is movably sleeved on the right half shaft 82. The differential lock 20 may include a stop rod 203, a fork rod 204, a pneumatic assembly 205, and a spring 206. The stop rod 203 is disposed in the differential 8, and the fork rod 204 is sleeved on the stop rod 203. In addition, the fork rod 204 is movable between the locked position and the unlocked position along the stop rod 203. The fork rod 204 is connected with the right gear sleeve 202. The pneumatic assembly 205 is connected with the fork rod 204. The pneumatic assembly 205 can drive the fork rod 204 to move. The spring 206 is sleeved on the stop rod 203. The spring 206 sleeve can drive the fork rod 204 to switch to the unlocked position. When the fork rod 204 is at the locked position, the differential lock 20 is in the locked state. When the fork rod 204 is at the unlocked position, the differential lock 20 is in the unlocked state.

Specifically, the pneumatic assembly 205 may include a switch piston 207 and a differential lock cylinder 208. The switch piston 207 is assembled on the differential lock cylinder 208, and the differential lock cylinder 208 is mounted to a rear cover of the differential 8 by a bolt. One end of the stop rod 203 is connected with the switch piston 207, and an other end is mounted to the rear cover of the differential 8 in a manner of being mated with the spring 206. The stop rod 203 passes through the fork rod 204, and the fork rod 204 is snapped into a groove of the right gear sleeve 202. The right gear sleeve 202 may be mated with the right half shaft 82 by splines. A threaded vent hole is machined in the differential lock cylinder 208 to connect the vehicle gas source. During venting, air compressed by the air compressor enters through the threaded vent hole of the differential lock cylinder 208. When thrust acting on the switch piston 207 is greater than an elastic force of the spring 206, the stop rod 203 moves under the thrust of the switch piston 207, and drives the fork rod 204 to move. The fork rod 204 moves axially along the right half shaft 82 until a gear of right gear sleeve 202 is meshed with a gear of the left gear sleeve 201, thereby locking the differential 8.

When the differential 8 is locked, the spring 206 is in a compressed state. When the differential lock cylinder 208 is no longer supplied with air, the spring 206 has elastic potential energy generated by the compression, and is to release the energy to restore an original state. The spring 206 pushes the stop rod 203, and drives the fork rod 204 and the right gear sleeve 202 to move, so as to return to an original position, thereby finally realizing locking or differential speeds of the left half shaft 81 and the right half shaft 82. A differential lock stroke sensor 209 is mounted to the differential lock cylinder 208. The differential lock stroke sensor 209 and the vehicle harness are connected with a dashboard in a cab. When the switch piston 207 moves under the action of air pressure, the whole circuit is connected under the action of an internal top pin of the sensor of the differential lock 20. The signal is displayed on the dashboard of the whole vehicle, and a driver can directly see in the cab whether the differential 8 is operating. When a driving gear is skidding, the differential 8 and the half shaft are locked as a whole, so that the differential 8 loses the differential function. In this way, all torques can be equally assigned to the two half shafts.

Figure 1:
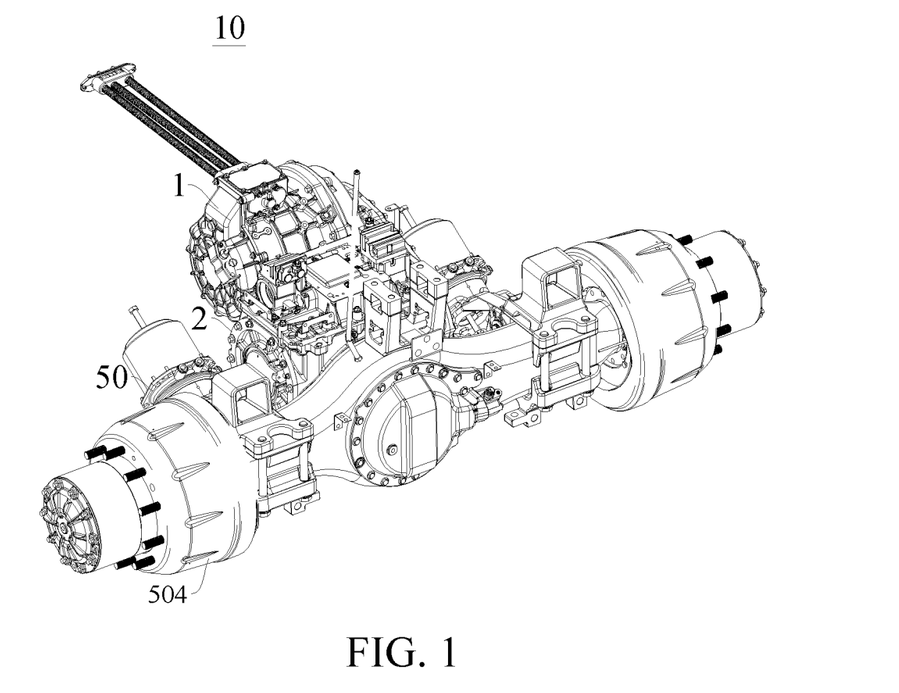
FIG. 1 is a schematic diagram of a drive axle assembly according to an embodiment of the disclosure.
Figure 2:
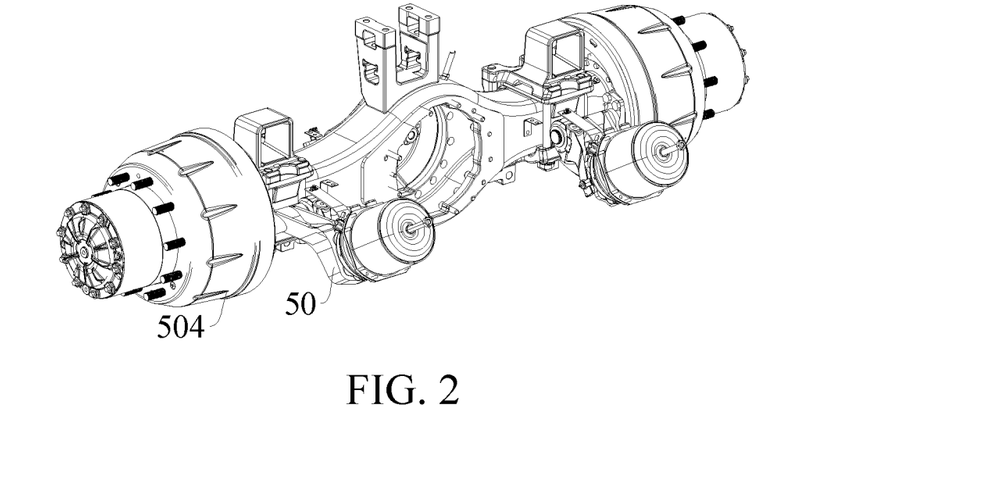
FIG. 2 is a schematic assembled diagram of a hub assembly and a brake of the drive axle assembly according to an embodiment of the disclosure.
Figure 3:
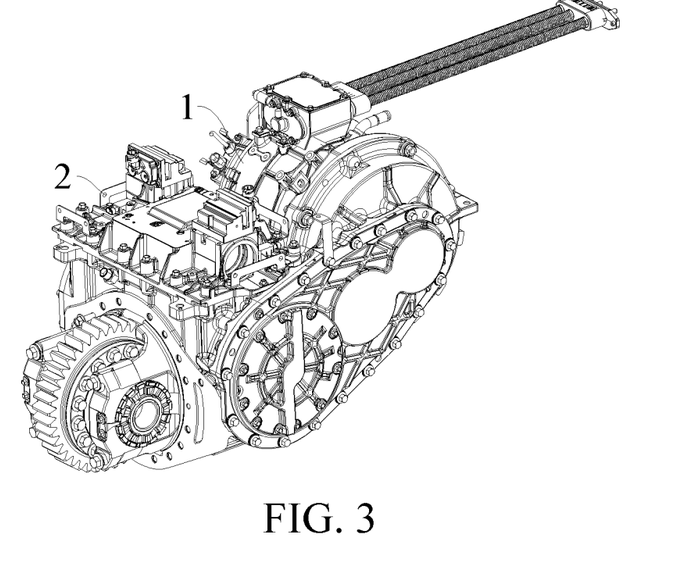
FIG. 3 is a schematic assembled diagram of a gearbox and a motor of the drive axle assembly according to an embodiment of the disclosure.

It should be noted that, the drive axle assembly 10 mainly includes an electric power assembly and an axle housing assembly. The axle housing assembly is a main supporting frame. A brake 50 is connected with a brake mounting flange 501 of the axle housing assembly by bolts, and a hub assembly 502 is mounted to a half shaft sleeve of the axle housing assembly. The hub assembly 502 is rotatable about the half shaft sleeve. The hub assembly 502 is axially locked by a round nut. Meanwhile, a clearance of the hub bearing is adjusted. An anti-skid brake system (ABS) sensor assembly 503 is fastened and assembled on the brake mounting flange 501 by screws. An induced voltage signal is formed during rotation of the magnetic head of the sensor and a sensing ring gear of the hub assembly 502. The signal is outputted to the vehicle control system to control the brake 50 to performing locking during braking. The differential lock 20 is assembled on the rear cover of the differential 8, and may indirectly control the slidable gear sleeve and the slidable gear sleeve on the differential 8 to be engaged or separated by connecting or disconnecting the gas source, thereby realizing the synchronization and different speeds of the driving gears. A planet gear of the gear-side planetary reducer 40 is assembled with the inner ring gear, and is fastened with the hub assembly 502 by screws to reduce a rotation speed outputted by the half shaft and then transmit the rotation speed to the gears of the vehicle. Finally, a brake drum 504 is assembled finally. The brake drum is fastened with the hub assembly 502 and the gear-side planetary reducer 40 by screws. Splines are formed on two ends of the half shaft. One end is connected with the differential 8, and an other end is connected with the planetary reducer. The power outputted by the differential 8 is outputted to the planetary reducer by using the half shaft, and then the power is transmitted to the hub assembly 502 and the brake drum 504, to drive the gears to rotate.

In the descriptions of this specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the disclosure. In this specification, schematic descriptions of the foregoing terms do not necessarily point at a same embodiment or example. In addition, the described specific features, structures, materials, or characteristics may be combined in a proper manner in any one or more of the embodiments or examples.

Although the embodiments of the disclosure have been shown and described, a person of ordinary skill in the art should understand that various changes, modifications, replacements and variations may be made to the embodiments without departing from the principles and spirit of this application, and the scope of this application is as defined by the appended claims and their equivalents.

What is claimed is:

1. A drive axle assembly of a vehicle, comprising:
   a motor;
   a first shaft and a second shaft, dynamically coupled to the motor, wherein the first shaft and the second shaft are both hollow shafts; a right planet row mechanism is disposed on the first shaft; a left planet row mechanism is disposed on the second shaft;
   a right sun gear of the right planet row mechanism is connected with the first shaft; a left sun gear of the left planet row mechanism is connected with the second shaft;
   the right sun gear is configured to rotate synchronously with the first shaft; the right sun gear has a right central oil passage and a right radial oil passage in communication with the right central oil passage; the right central oil passage is in communication with the first shaft; and the left sun gear is configured to rotate synchronously with the second shaft; the left sun gear has a left central oil passage and a left radial oil passage in communication with the left central oil passage; the left central oil passage is in communication with the second shaft; and the first shaft is in communication with the second shaft to supply oil to the second shaft.

2. The drive axle assembly of a vehicle according to claim 1, wherein further comprising:
   a first gear, a second gear, the first shaft, and the second shaft, connected with the motor in sequence;
   a gearbox;
   a right fork, movable between a first position and a second position;
   a right inner ring-gear support;
   a right sun gear, a right inner planet gear, and a right outer planet gear, disposed in a right inner ring-gear support, wherein the right inner planet gear is meshed with the right sun gear; and
   the right outer planet gear is meshed with both the right inner planet gear and the right inner ring-gear support;

a right planet support, connected with the right inner planet gear and the right outer planet gear;
a left fork, movable between a third position and a fourth position;
a left inner ring-gear support;
a left sun gear and a left planet gear, disposed in a left inner ring-gear support, wherein the left sun gear is configured to rotate coaxially with the right inner ring-gear support; the left planet gear is meshed with both the left sun gear and the left inner ring-gear support; and the left sun gear is configured to rotate synchronously with the second shaft;
a driving gear, configured to rotate synchronously with the left planet gear by using a left planet support; and
a differential, connected with the driving gear, wherein when the right fork is at the first position, the right planet support is connected with the gearbox;
when the right fork is at the second position, the right planet support is connected with the first shaft;
when the left fork is at the third position, the left inner ring-gear support is connected with the gearbox; and
when the left fork is at the fourth position, the left inner ring-gear support is connected with the second shaft.

3. The drive axle assembly of a vehicle according to claim 2, wherein the gearbox comprises a right end cover; the right end cover has a pump body therein; the pump body has an oil inlet and an oil outlet; the oil outlet is in communication with the first shaft; and the oil inlet is in communication with inside of the gearbox.

4. The drive axle assembly of a vehicle according to claim 3, wherein a filter is disposed at the oil inlet.

5. The drive axle assembly of a vehicle according to claim 4, wherein the right end cover has a first oil supply branch therein; and the filter and the oil inlet are brought into communication with each other by using the first oil supply branch.

6. The drive axle assembly of a vehicle according to claim 4, wherein the right end cover has a second oil supply branch therein; the second oil supply branch is in communication with the oil outlet; and the second oil supply branch supplies oil to a meshed position between the first gear and the second gear by using a connected pipe.

7. The drive axle assembly of a vehicle according to claim 1, wherein the right radial oil passage comprises a plurality of right radial oil passages; and the left radial oil passage comprises a plurality of left radial oil passages.

8. The drive axle assembly of a vehicle according to claim 2, further comprising:
a shift solenoid valve, connected with the left fork and the right fork to drive the left fork and the right fork to move.

9. The drive axle assembly of a vehicle according to claim 8, wherein the shift solenoid valve comprises:
an intake pipe, in communication with a gas source;
a vent pipe;
a right valve seat, being a hollow structure and having a first gas channel and a second gas channel;
a right valve core, movably disposed in the right valve seat to separate an inner space of the right valve seat into a first cavity and a second cavity, wherein the first gas channel is in communication with the first cavity, the second gas channel is in communication with the second cavity; the right valve core is pushed to move by controlling air pressure of the first cavity and the second cavity; and the right valve core is connected with the right fork;
a first solenoid valve, connected and in communication with the first gas channel, the intake pipe, and the vent pipe to control the first gas channel to allow or prevent flow of a gas through the first gas channel;
a second solenoid valve, connected and in communication with the second gas channel, the intake pipe, and the vent pipe to control the second gas channel to allow or prevent flow of a gas through the second gas channel;
a left valve seat, being a hollow structure and having a third gas channel and a fourth gas channel;
a left valve core, movably disposed in the left valve sea to separate an inner space of the left valve seat into a third cavity and a fourth cavity, wherein the third gas channel is in communication with the third cavity, the fourth gas channel is in communication with the fourth cavity, the left valve core is pushed to move by controlling air pressure of the third cavity and the fourth cavity, and the left valve core is connected with the left fork;
a third solenoid valve, connected and in communication with the third gas channel, the intake pipe, and the vent pipe to control the third gas channel to allow or prevent flow of a gas through the third gas channel; and
a fourth solenoid valve, connected and in communication with the fourth gas channel, the intake pipe, and the vent pipe to control the fourth gas channel to allow or prevent flow of a gas through the fourth gas channel.

10. The drive axle assembly of a vehicle according to claim 9, wherein a muffler is disposed on the vent pipe.

11. The drive axle assembly of a vehicle according to claim 10, wherein the left fork is inserted in the left valve seat; the left fork is connected with the left valve core by a left threaded member;
the right fork is inserted in the right valve seat; and the right fork is connected with the right valve core by a right threaded member.

12. The drive axle assembly of a vehicle according to claim 2, further comprising:
a left half shaft, connected with the differential; and
a right half shaft, connected with the differential by a differential lock, wherein the differential lock is switchable between a locked state and an unlocked state;
when the differential lock is in the locked state, the left half shaft and the right half shaft rotate at a same speed; and
when the differential lock is in the unlocked state, the left half shaft and the right half shaft rotate at different speeds.

13. The drive axle assembly of a vehicle according to claim 12, wherein a left gear sleeve is disposed on the left half shaft;
a right gear sleeve is disposed on the right half shaft and movably sleeved on the right half shaft; the differential lock comprises:
a stop rod, disposed in the differential;
a fork rod, sleeved on the stop rod, movable between a locked position and an unlocked position along the stop rod, and connected with the right gear sleeve;
a pneumatic assembly, connected with the fork rod to drive the fork rod to move;
a spring, sleeved on the stop rod to drive the fork rod to switch to the unlocked position; and
when the fork rod is at the locked position, the differential lock is in the locked state; and when the fork rod is at the unlocked position, the differential lock is in the unlocked state.

\* \* \* \* \*